(12) United States Patent
Chen et al.

(10) Patent No.: US 9,929,467 B2
(45) Date of Patent: Mar. 27, 2018

(54) ANTENNA MODULE AND MOBILE COMMUNICATION DEVICE HAVING THE SAME

(71) Applicant: PEGATRON CORPORATION, Taipei (TW)

(72) Inventors: Chun-Chih Chen, Taipei (TW); Chien-Yi Wu, Taipei (TW); Chun-Wei Wang, Taipei (TW); Hau-Yuen Tan, Taipei (TW); Chia-Ho Ting, Taipei (TW); I-Shu Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 115 days.

(21) Appl. No.: 15/008,231

(22) Filed: Jan. 27, 2016

(65) Prior Publication Data

US 2016/0226143 A1  Aug. 4, 2016

(30) Foreign Application Priority Data

Jan. 30, 2015 (TW) ............................... 104103196 A

(51) Int. Cl.
| | | |
|---|---|---|
| H01Q 1/24 | (2006.01) | |
| H01Q 1/48 | (2006.01) | |
| H01Q 5/10 | (2015.01) | |
| H04B 1/3827 | (2015.01) | |
| H01Q 5/371 | (2015.01) | |
| H01Q 5/378 | (2015.01) | |
| H04M 1/02 | (2006.01) | |

(52) U.S. Cl.
CPC ............... *H01Q 5/10* (2015.01); *H01Q 1/243* (2013.01); *H01Q 1/48* (2013.01); *H01Q 5/371* (2015.01); *H01Q 5/378* (2015.01); *H04B 1/3838* (2013.01); *H04M 1/026* (2013.01)

(58) Field of Classification Search
CPC ............................. H01Q 1/243; H04B 1/3838
See application file for complete search history.

(56) References Cited

U.S. PATENT DOCUMENTS

| | | | |
|---|---|---|---|
| 8,723,749 B2* | 5/2014 | Lin ........................ | H01Q 5/328 343/772 |
| 2015/0022403 A1* | 1/2015 | Lin .......................... | H01Q 1/44 343/702 |

FOREIGN PATENT DOCUMENTS

| | | |
|---|---|---|
| TW | M460421 U1 | 8/2013 |
| TW | M484801 U | 8/2014 |
| TW | 201440319 A | 10/2014 |
| TW | 201442338 A | 11/2014 |
| TW | 201445814 A | 12/2014 |

* cited by examiner

*Primary Examiner* — Jessica Han
*Assistant Examiner* — Amal Patel
(74) *Attorney, Agent, or Firm* — Muncy, Geissler, Olds & Lowe, P.C.

(57) ABSTRACT

An antenna module is disclosed. The antenna module is applied to a mobile communication device and includes a first radiating element and a second radiating element. The first radiating element is disposed on a base board inside the mobile communication device, and one point of the first radiating element is a feed point of the antenna module. The second radiating element is disposed on the base board and is grounded by connecting to a P-sensor inside the mobile communication device. There is a gap between one part of the second radiating element and the first radiating element.

10 Claims, 3 Drawing Sheets

ANTENNA MODULE AND MOBILE COMMUNICATION DEVICE HAVING THE SAME

BACKGROUND

1. Technology Field

The present disclosure relates to an antenna module, especially to an antenna module which integrates a proximity sensing function with a communication function.

2. Description of the Related Art

Rapid developments in communication technology have led to a flourishing wireless communication industry. Mobile communication devices, such as smart phones, have become essential electronic products for most people. However, due to the miniaturization trend of electronic products, an important issue for product manufacturers is to properly use the limited space inside the mobile communication devices.

Generally, current mobile communication devices have a sensor pad disposed on one a side of the case of a mobile communication device and close to an antenna module except having the antenna module, and the sensor pad is used for sensing the approach of a human body. However, when the space where components are disposed is limited, the disposition of the sensor pad may limit the disposition area of the antenna module, which will affect the bandwidth range of the antenna module.

SUMMARY

It is a primary object of the present disclosure to provide an antenna module which integrates a proximity sensing function with a communication function.

It is another primary object of the present disclosure to provide a mobile communication device having the above antenna module.

To achieve the above object, the antenna module of the present disclosure is applied to a mobile communication device having a case, a base plate and a proximity sensor, wherein the base plate and the proximity sensor are disposed inside the case. The antenna module of the present disclosure comprises a first radiating element and a second radiating element. The first radiating element is disposed on the base plate and comprises a feed point. The second radiating element is disposed on the base plate and is grounded by electrically connecting to the proximity sensor. A part of the second radiating element and the first radiating element are separated by a distance which is less than a specific distance, such that the first radiating element excites the second radiating element, via capacitive coupling and the proximity sensor senses an induction signal when a conductive object approaches the second radiating element. The induction signal is generated by the sensing of capacitance between the second radiating element and the conductive object.

Additionally, the present disclosure provides a mobile communication device. The mobile communication device comprises a case, a base plate, a proximity sensor and the above antenna module.

BRIEF DESCRIPTION OF THE DRAWINGS

The exemplary embodiment(s) of the present invention will be understood more fully from the detailed description given below and from the accompanying drawings of various embodiments of the invention, which should not be taken to limit the invention to the specific embodiments but are for explanation and understanding only.

DETAILED DESCRIPTION OF THE PREFERRED EMBODIMENT

Figure 1:
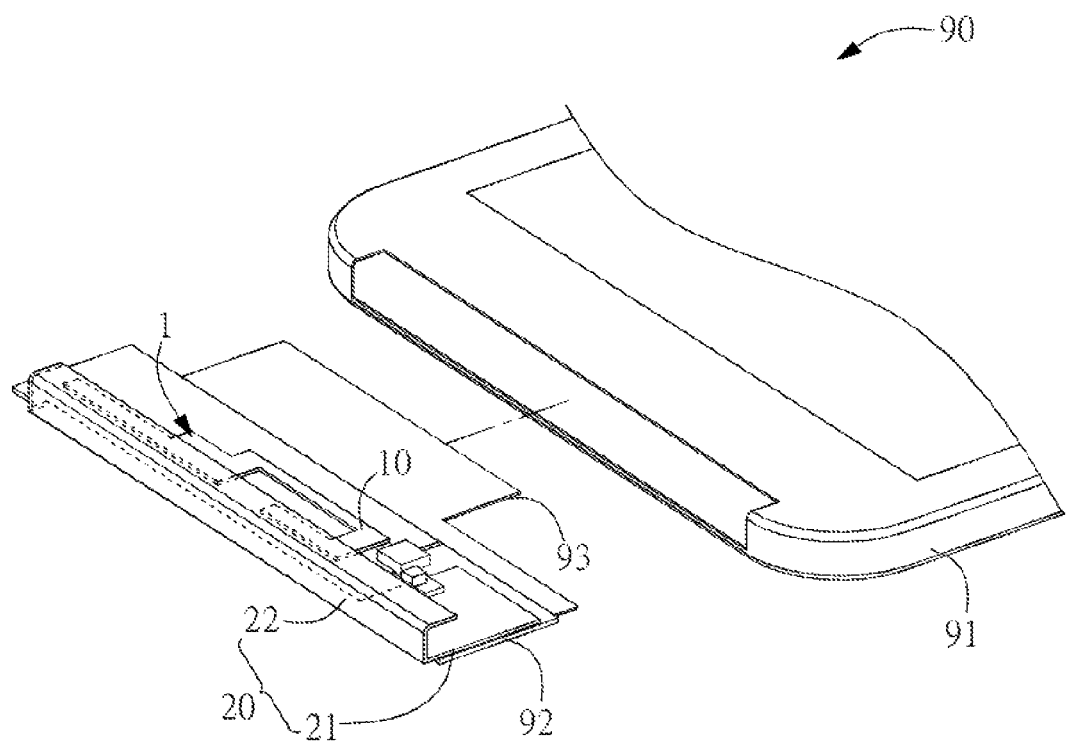
FIG. 1 is a partially exploded diagram of a mobile communication device according to the present invention.
Figure 2:
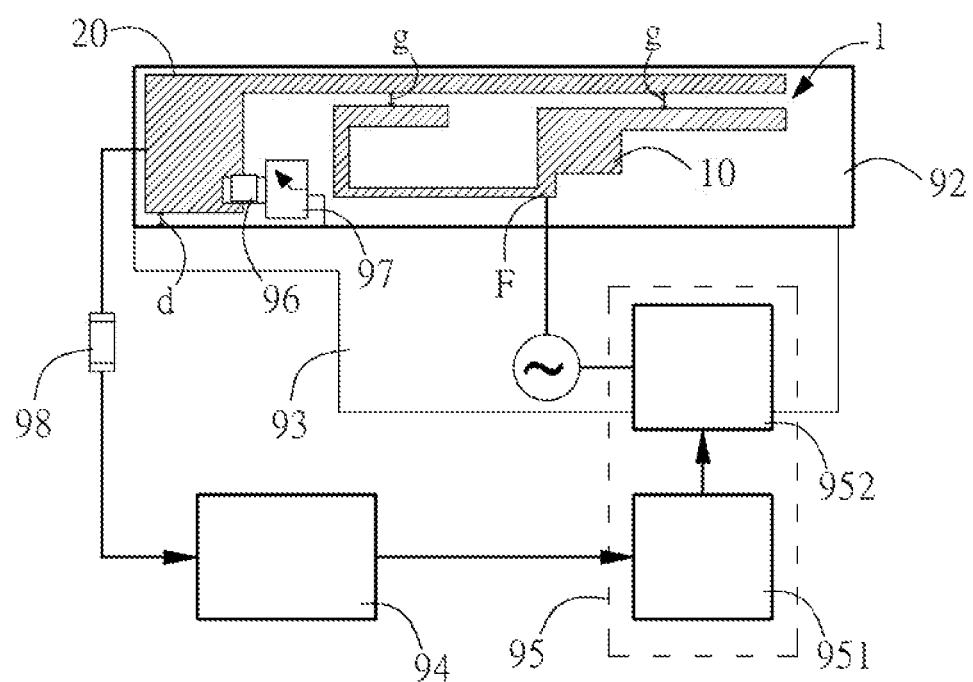
FIG. 2 is a schematic diagram which shows the connection relationships of each of the components inside a case of the mobile communication device.
Figure 3:
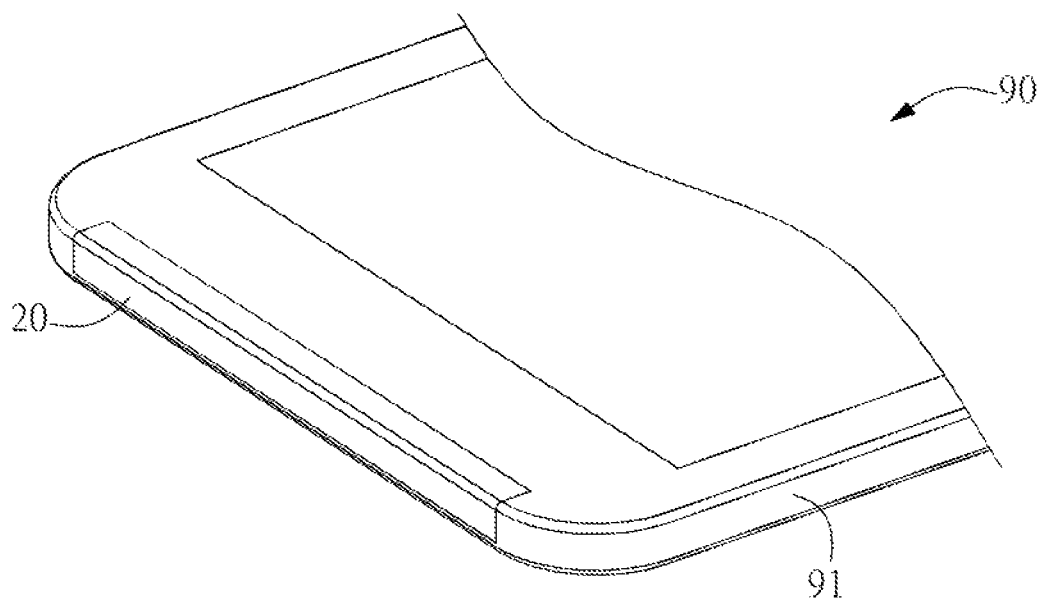
FIG. 3 is a partial schematic diagram of the mobile communication device.

Please refer to FIG. 1 to FIG. 3, which illustrate the schematic structure of a mobile communication device of the present invention.

As shown in FIG. 1 and FIG. 2, in one embodiment of the present invention, an antenna module 1 of the present invention is applied to a mobile communication device 90. In addition to the antenna module 1, the mobile communication device 90 further comprises a case 91, a base plate 92, a ground plane 93, a proximity sensor 94, a communication system 95, a capacitor 96, a switch element 97, and an inductance 98. In a specific embodiment of the present invention, the mobile communication device 90 is a smart phone, but the present invention is not limited to this embodiment.

In one embodiment of the present invention, the base plate 92 is disposed inside the case 91. The ground plane 93 is also disposed inside the case 91 and is next to the base plate 92, wherein the ground plane 93 is a ground plane of all the components of the mobile communication device 90.

In one embodiment of the present invention, the proximity sensor 94 is disposed inside the case 91. The communication system 95 is also disposed inside the case 91 and is electrically connected to the proximity sensor 94. The communication system 95 comprises a control chip 951 and a power amplifier 952. The control chip 951 is used for receiving or sending radio frequency signals. The power amplifier 952 is electrically connected to the ground plane 93 and the control chip 951. The power amplifier 952 is used for amplifying the radio frequency signals sent by the control chip 951.

In one embodiment of the present invention, the antenna module 1 comprises a first radiating element 10 and a second radiating element 20. The first radiating element 10 is disposed on the base plate 92 and comprises a feed point F electrically connected to the power amplifier 952 of the communication system 95. The second radiating element 20 comprises a first radiating portion 21 and a second radiating portion 22. The first radiating portion 21 is disposed on the base plate 92, and one end of the first radiating portion 21 and the ground plane 93 are separated by a spacing distance d. The second radiating portion 22 is formed by outwardly extending from a side of the first radiating portion 21 and bending twice, and the second radiating portion 22 of the second radiating element 20 forms a part of the case 91 (as shown in FIG. 3). The second radiating element 20 is electrically connected to the proximity sensor 94 so as to electrically connect to the ground plane 93 (i.e., to ground). One part of the first radiating portion 21 of the second radiating element 20 and the first radiating element 10 are separated by a distance g which is less than a specific distance (e.g., 3 mm), such that the second radiating element 20 is excited by the first radiating element 10 via capacitive coupling such that the first radiating element 10 and the second radiating element 20 resonantly generate a low frequency resonant mode having a bandwidth of approximately 700~960 Mhz and a high frequency resonant mode having a bandwidth of approximately 1700~2700 Mhz, both being the bandwidth range covering the 3G/LTE operating frequency band.

In addition, when a conductive object (e.g., a human face) approaches the second radiating portion 22 of the second radiating element 20, an induction signal is generated by the sensing of the capacitor between the second radiating element 20 and the conductive object. The proximity sensor 94 can sense the induction signal and inform the control chip 951 of the induction signal after sensing the induction signal, such that the control chip 951 reduces the radiation power of the mobile communication device 1 so as to reduce the effect of radiation generated by the components upon the human body.

In one embodiment of the present invention, one end of the capacitor 96 is electrically connected to the second radiating element 20, and another end of the capacitor 96 is electrically connected to the switch element 97. One of the switch element 97 is electrically connected to the ground plane 93 (i.e., to ground) such that the capacitor 96 can be grounded or not grounded by turning on or off the switch element 97. In other words, the switch element 97 is used for controlling whether the capacitor 96 is grounded or not grounded. When the switch element 97 is turned on, the capacitor 96 is grounded. In this situation, a resonant path formed by the second radiating element 20 changes the bandwidth of the low frequency resonant mode such that it is in the range of 700~800 Mhz. When the switch element 97 is turned off, the capacitor 96 is an open circuit and is not grounded. In this situation, another resonant path formed by the second radiating element 20 changes the bandwidth of the low frequency resonant mode such that it is in the range of 869~960 Mhz. In one specific embodiment of the present invention, the switch element 97 is a single-pole single throw switch, but the present invention is not limited to this embodiment.

In one embodiment of the present invention, one end of the inductance 98 is electrically connected to the second radiating element 20, and another end of the inductance 98 is electrically connected to the proximity sensor 94. The inductance 98 is used for preventing radiation signals from escaping to the proximity sensor 94 to prevent degradation of the performance of the radiation signals.

As explained in the description above, the second radiating element 20 of the antenna module 1 of the present invention is not only an emitter of antenna signals but also a sensor pad of the proximity sensor 94 such that the emitter and the sensor pad can be integrated in order to reduce the space required for the disposition of components, such that the disposition of the antenna module 1 is not limited by the location of the sensor pad. This design effectively solves the problem of the above prior art.

In summary, regardless of the function, the method and result of the present invention are shown to have technical characteristics different from those of the prior arts, and said method and result constitute a significant advance in the field. It is hoped that the examiners will appreciate the novelty of the present invention and grant this patent. However, the aforementioned embodiment is just for illustration of the principle and the result of the present invention and should not be construed to limit the range of the present invention. It will be obvious to those skilled in the art that, based upon the content herein, changes and modifications may be made without departing from the spirit and scope of the present invention. Therefore, the appended claims are intended to encompass within their scope all such changes and modifications as are within the true spirit and scope of the exemplary embodiment(s) of the present invention.

What is claimed is:

1. An antenna module applied to a mobile communication device, wherein the mobile communication device comprises a case, a base plate and a proximity sensor, and the base plate and the proximity sensor are disposed inside the case, the antenna module comprising:
a first radiating element, disposed on the base plate and comprising a feed point; and
a second radiating element, disposed on the base plate and grounded by electrically connecting to the proximity sensor; a part of the second radiating element and the first radiating element are separated by a distance which is less than 3 mm, such that the first radiating element excites the second radiating element via capacitive coupling and the proximity sensor senses an induction signal when a conductive object approaches the second radiating element,
wherein the second radiating element comprises a first radiating portion and a second radiating portion; the first radiating portion is disposed on the base plate,
wherein the first radiating portion and the first radiating element are separated by the distance which is less than 3 mm; the second radiating portion is formed by outwardly extending from a side of the first radiating portion and bending twice, and the second radiating portion of the second radiating element is a part of the case.

2. The antenna module as claimed in claim 1, wherein the mobile communication device further comprises a capacitor and a switch element; one end of the capacitor is electrically connected to the second radiating element, and another end of the capacitor is electrically connected to the switch element; one end of the switch element is grounded and the switch element is used for controlling whether the capacitor is grounded or not grounded.

3. The antenna module as claimed in claim 2, wherein the mobile communication device further comprises an inductance; one end of the inductance is connected to the second radiating element, and another end of the inductance is connected to the proximity sensor.

4. The antenna module as claimed in claim 1, wherein the mobile communication device further comprises an inductance; one end of the inductance is connected to the second radiating element, and another end of the inductance is connected to the proximity sensor.

5. The antenna module as claimed in claim 1, wherein the mobile communication device further comprises a communication system; the communication system is grounded and is electrically connected to the proximity sensor and the feed point; the communication system is used for reducing the radiation power of the mobile communication device when the proximity sensor senses the induction signal.

6. A mobile communication device, comprising:
a case;
a base plate, disposed inside the case;
a proximity sensor, disposed inside the case; and
an antenna module, comprising:
a first radiating element, disposed on the base plate and comprises a feed point; and
a second radiating element, disposed on the base plate and grounded by electrically connecting to the proximity sensor; a part of the second radiating element and the first radiating element are separated by a distance which is less than 3 mm such that the first radiating element excites the second radiating element via capacitive coupling and the proximity sensor senses an induction signal when a conductive object approaches the second radiating element, wherein the second radiating element comprises a first radiating portion and a second radiating portion; the first radiating portion is disposed on the base plate, wherein the first radiating portion and the first radiating element are separated by the distance which is less than 3 mm; the second radiating portion is formed by outwardly extending from a side of the first radiating portion and bending twice, and the second radiating portion of the second radiating element is a part of the case.

7. The mobile communication device as claimed in claim 6, further comprising a capacitor and a switch element; one end of the capacitor is electrically connected to the second radiating element, and another end of the capacitor is electrically connected to the switch element; one end of the switch element is grounded and the switch element is used for controlling whether the capacitor is grounded or not grounded.

8. The mobile communication device as claimed in claim 7, further comprising an inductance; one end of the inductance is connected to the second radiating element, and another end of the inductance is connected to the proximity sensor.

9. The mobile communication device as claimed in claim 6, further comprising an inductance; one end of the inductance is connected to the second radiating element, and another end of the inductance is connected to the proximity sensor.

10. The mobile communication device as claimed in claim 6, further comprising a communication system; the communication system is grounded and electrically connected to the proximity sensor and the feed point; the communication system is used for reducing the radiation power of the mobile communication device when the proximity sensor senses the induction signal.

* * * * *